United States Patent [19]

Pennachetti et al.

[11] 3,769,054

[45] Oct. 30, 1973

[54] PROCESS FOR THE TREATMENT OF FLY ASH

[75] Inventors: John T. Pennachetti, St. Catharines; Joseph F. Boux, Burlington, Ontario, both of Canada

[73] Assignee: Enercon International Limited, Hamilton, Ontario, Canada

[22] Filed: Apr. 26, 1972

[21] Appl. No.: 247,516

Related U.S. Application Data

[62] Division of Ser. No. 34,874, May 5, 1970, Pat. No. 3,669,703, which is a division of Ser. No. 687,465, Dec. 4, 1967, Pat. No. 3,533,819.

[52] U.S. Cl. .......................... 106/288 B, 106/DIG. 1
[51] Int. Cl. ............................................. C08h 17/04

[58] Field of Search .................... 106/288 B, DIG. 1

[56] References Cited
UNITED STATES PATENTS
2,987,408  6/1961  Minnick .......................... 106/288 B Primary Examiner—Curtis R. Davis
Attorney—Peter W. McBurney et al.

[57] ABSTRACT

Fly ash is subjected to a plurality of operations to recover therefrom a multiplicity of valuable products, including an iron concentrate, an improved pozzolanic material, a high carbon content product and an agglomerable material, suitable for formation into a controlled sintered aggregate product.

3 Claims, No Drawings

PROCESS FOR THE TREATMENT OF FLY ASH

This application is a division of application Ser. No. 34,874 filed May 5, 1970, now U.S. Pat. No. 3,669,703, which in turn is a division of application Ser. No. 687,465 filed Dec. 4, 1967, now U.S. Pat. No. 3,533,819.

This invention relates to a process for treating fly ash to produce a multiplicity of valuable products comprising an iron concentrate product, an improved pozzolan product, a carbon product and an agglomerate product, said treating process including the step of air classifying fly ash or a fly ash fraction. Included within the scope of the invention are the improved pozzolan product and the carbon product produced by the foregoing process.

Fly ash is a by-product derived from the combustion of coal in boiler plants and the like. Pulverized coal is fed to boiler plants where this coal is burned, thereby producing two types of ash; a light finely divided "fly" ash which is carried out in suspension in the gaseous products of combustion and a heavier "bottom" ash which falls to the bottom of the furnace and is removed therefrom. Fly ash may be separated from the entraining combustion gas stream by an electrostatic precipitator or a mechanical collector plus an electrostatic precipitator in series. Chemically, fly ash contains 5 percent or more of carbon with the remainder being a heterogeneous mixture of oxides of iron, silicon, aluminum and calcium. Fly ash is an extremely fine, e.g., in excess of 95 percent by weight passes a 100 mesh screen and in excess of 60 percent by weight passes a 325 mesh screen, and light weight particulate material. These properties cause a difficult disposal problem since the fly ash readily becomes windborn if stockpiled.

Since fly ash is generally a waste material having little economic value and which is difficult to dispose of, many efforts have been made to find economic uses for the untreated material as well as fractions of the fly ash material. For example, in U. S. Pat. No. 3,213,167, issued Oct. 19, 1965 to Harold T. Sterling, a process for pelletizing and sintering fly ash to form light weight aggregate is disclosed. While such aggregate has a definite economic value, it is important that it be of uniform quality throughout; furthermore, it would be desirable to include fly ash or a fly ash fraction as a pozzolan product in concrete. However, the direct use of fly ash as pozzolan in concrete normally has the disadvantages of depressing air entrainment in the concrete and causing water requirements to be non-uniform and unpredictable. The fly ash fraction heretofore used as pozzolan in concrete, represents only a portion of the total fly ash material. Another fraction of fly ash has been recovered as an iron concentrate, but this fraction represents less than 20 percent of the total fly ash. Thus, an economically attractive, satisfactory and complete upgrading of fly ash material into a valuable product or products has heretofore been an unachieved goal.

It has now been discovered that a complete and economically attractive utilization of fly ash material is made possible by a process that provides a multiplicity of valuable products comprising an iron concentrate product, an improved pozzolan product, a carbon product and an agglomerate product of uniform quality. These goals can all be realized by a simple treating process which includes the steps of air classification, carbon product removal, iron separation, and agglomeration of a fly ash material. Such a process has the advantage of fully and completely utilizing all of the fly ash to form economically attractive products.

A preferred process for treating fly ash to produce the aforementioned four valuable products comprises the steps of: (1) magnetically separating fly ash material into an iron concentrate product and a nonmagnetic fly ash fraction; (2) air classifying the nonmagnetic fraction into an improved pozzolan product and a coarse fly ash fraction; (3) screening the coarse fly ash fraction to obtain a coarse carbon product containing a minimum of 25 percent carbon by weight and a fine, sinter fraction; (4) pelletizing the sinter fraction; (5) preheating said pellets; and (6) sintering the preheated pellets at a temperature between 1,900° and 2,800° F. to form a stable, light tan, heat hardened aggregate product. The novel pozzolan and carbon products produced by the foregoing process are also part of the invention.

An important characteristic of the invention process is the inclusion of the step of air classification of fly ash or a fly ash fraction to obtain a first fine fraction and a second heavier fraction. The fine fraction is entrained in the classifying air stream and passes into a separator apparatus, e.g., a cyclone separator, where it is separated from the air and discharged into a suitable collector. The second, heavier fraction is not entrained in the classifying air stream and drops by gravity to an apparatus, e.g., a fan, which discharges it to another collector. A characteristic of the first fine fraction is the uniform fine particle size, i.e.., generally in excess of 85 percent, preferably in excess of 95 percent, passes a 325 mesh screen; whereas, the second, heavier fraction has a particle size distribution ranging from 100 mesh particles to −325 mesh particles.

The fine fraction is useful as an improved pozzolan product in concrete mixtures when freed from its magnetic iron, either before or after the air classification operation. As is well known, pozzolanic materials are generally finely divided siliceous and aluminous substances which are not cementitious themselves, but combine with alkali (including alkaline earths) and water to form stable compounds of cementitious value. The pozzolan product obtained by the novel process is particularly attractive as a component in highway concrete mixtures because of its substantially uniform small particle size and its reduced iron and carbon contents. In addition to providing the desirable properties afforded by raw fly ash pozzolan such a prevention of undesirable aggregate growth, reduction in bleeding, and greater resistance to chemical attack, the improved pozzolan product avoids the disadvantages of raw fly ash pozzolan. More particularly, the pozzolaan product from the inventive process does not interfere with air entrainment in the concrete, does not increase the water requirement and minimizes the staining problem due to its reduced iron content. The improved pozzolan product is also desirable because it is more reactive with cement than ordinary pozzolans and it replaces more portland cement. It can also be used in other binder materials. Accordingly, the pozzolan product from the described process is truly an improved pozzolan product for use in combination with the usual components found in concrete mixtures.

As hereinabove stated, one of the characteristics of the improved pozzolan product is its uniform, fine particle size, e.g., preferably in excess of 95 percent passing a 325 mesh screen. This particle size can be controlled during the air classification operation by properly integrating the variables of product flow rate, air flow rate, baffle arrangement and, where appropriate, classifier rotational speed. More specifically, the effect of the rotational speed of the classifier in a Model 753 Centri-Sonic Classifier apparatus upon the particle size of the fines fraction is set forth in Table A. In the described test, raw fly ash was fed to the air classification apparatus at a rate of 7-8 tons/hr. and the air flow rate was maintained in the range of about 5,000 CFM.

When the iron separation step comprises a magnetic separation which precedes the air classification step, the raw fly ash material is introduced into a magnetic field to separate the magnetic fraction in the fly ash from the non-magnetic fraction. Generally the separation operation can be carried out on dry fly ash material using magnetized belts or rotary drum rotating about a stationary magnetic assembly. The latter apparatus is preferred for the finely divided raw fly ash material because by using a series of drums in tandem and varying their speeds, iron concentrate products having in the range of about 45 to 65 percent by weight of iron can be obtained.

When using the magnetic separator, raw fly ash is transported to a feeding point located above the rotor piece which is located within a gravity conveying means. All of the feed material passes over the rotor. Separation occurs because the magnetic material adheres to the surface of the rotor from which it is scraped, or falls, off into a separate collector; whereas, the non-magnetic fraction is not held to the drum by magnetic force and is removed by a combination of centrifugal force and gravity. The iron concentration in the magnetic and non-magnetic products can be readily controlled by the number of rotary separators in series or tandem and by varying the speed of rotation and other process variables.

The iron concentrate product normally comprises less than about 5-35 percent and generally about 10-30 percent of the raw fly ash material calculated as $Fe_2O_3$. The iron concentrate can be agglomerated to form a product useful for many purposes such as blast furnace feed material, open hearth feed, basic oxygen furnace feed, etc. This iron concentrate can, if desired, also be used in processes where fine iron powder is desired such as in washing plants, thermowelding material, as an additive to building materials, in powdered metallurghy, etc. However, the most economically attractive use is in the steel making process.

If a magentic separation step follows the air classification step, it is understood that a second magnetic separator may be required. Both the fine fraction and the heavy ends fraction from the air classification operation can be subjected to magnetic separation in the same or different units and the magnetic fractions from each separation unit can be combined to form the iron concentrate product.

In any event the non-magnetic heavy ends fraction from the air classifier is subsequently subjected to a dry screening operation to separate a coarse carbon product from a finer fraction to be agglomerated. The mesh size of the screen used to make the separation would generally be in the range of 100 mesh to 150 mesh with the precise selection of screen size to be determined by screen and carbon analyses of the particular fly ash being treated. Generally, the particular screening device used would be either the rotary type or the vibrating type in order to avoid clogging of the screen.

Usually, the carbon product will contain at least 25 percent and preferably over 30 percent by weight of

TABLE A

| Test No. | Classifier product (RPM) | Product | Weight (lbs) | Weight (%) | Screen analysis (wt %) | | | | |
|---|---|---|---|---|---|---|---|---|---|
| | | | | | +100 | −100 +150 | −150 +200 | −200 +325 | −325 |
| 1 | 1225 | Fines | 305 | 51.3 | | | | 1.5 | 98.5 |
| | | Heavy ends | 290 | 48.7 | 3.9 | 5.8 | 12.1 | 23.9 | 54.3 |
| 2 | 1090 | Fines | 285 | 50.9 | | | | 1.2 | 98.8 |
| | | Heavy ends | 275 | 49.1 | 4.3 | 5.5 | 12.1 | 23.6 | 54.5 |
| 3 | 625 | Fines | 310 | 61 | | | 0.8 | 3.4 | 95.8 |
| | | Heavy ends | 198 | 39 | 6.7 | 7.7 | 19.4 | 29.8 | 36.5 |
| 4 | 1050 | Fines | 1180 | 59.8 | | 0.2 | 0.9 | 2.7 | 96.2 |
| | | Heavy ends | 725 | 40.2 | 4.7 | 6.6 | 16.3 | 29.1 | 43.2 | carbon. The larger fly ash particles generally have the highest carbon content and it is therefore possible to vary the percentage of carbon in the final product at will by using screens of various sizes. Thus a higher grade carbon product can be obtained by using a 100 mesh screen than a 150 mesh screen. On the other hand, more total carbon (with a lower percentage of carbon in the carbon product) can be removed from the fly ash by using the 150 mesh screen. The screen size will accordingly be chosen in accordance with the process requirements keeping in mind the objective of maintaining a uniform quality agglomerate product. This carbon product is useful as a fuel in many processes, and in some cases, can be resold to the plant that formed the fly ash initially. Careful screening within a select particle size range, advantageously preceded by a pulverization step, allows the recovery of trace elements such as titanium, germanium, and gallium. Silica and alumina can be recovered in a similar manner.

While the order or sequence of steps can be varied, in a preferred embodiment wherein the fly ash is first treated to remove an iron concentrate, then air classified and the heavy ends therefrom screened to form a carbon product and an agglomerate feed material, the fine fraction suitable for agglomeration passing through the screen is desirably transported to a pelletizing drum where it is moistened with water and formed into pellets having a predetermined size generally between 0.25 and 0.5 inches. The pellets from the pelletizer are then transported either directly to the sintering operation or to a preheating zone where they are desirably heated to a temperature between 1,200° F. and 1,800° F. and preferably maintained at that temperature for a period of five to fifteen minutes prior to being sintered at a temperature between 1,900° and 2,800°F. to form a lightweight sintered aggregate product.

The fine fraction from the dry screening operation will usually comprise a mixture of particle sizes, the largest particles passing through the meshes of the screen selected and the smallest particles being smaller than 325 mesh. While the iron and carbon concentrations in the fine sinter fraction are variable, they will normally be lower than the corresponding concentrations in the raw fly ash material. Where the iron concentration exceeds the desired value, the fine sinter product can be mixed with a portion of the improved pozzolan product to obtain a sinter product blend with a lower iron concentration below about 10 percent and preferably below about 7 percent by weight. The product to be agglomerated by sintering will desirably contain about 5 to 8 percent of the original carbon to serve as fuel during the sintering.

The following examples illustrate the process and products of this invention.

Example I

A fly ash material was obtained from a precipitator in a steam generating plant. Chemical analysis of a sample of the fly ash material showed an iron concentration of 12.9 percent by weight and a carbon concentration of 8.2 percent by weight. A sieve analysis of a sample of fly ash yielded the particle size distribution shown in Table B.

TABLE B

| Tyler Sieve Size (mesh) | % by weight |
|---|---|
| +100 | 3.76 |
| −100, +150 | 3.61 |
| −150, +200 | 8.85 |
| −200, +325 | 15.00 |
| −325 | 68.78 |

One hundred pounds of the fly ash material was fed to a magnetic separator to separate the feed material into a magnetic portion and a non-magnetic portion. The magnetic separator comprised a first slower speed drum rotating at 65 RPM through which all of the feed material was passed and a second higher speed drum rotating at 200 RPM through which the magnetic portion of the first drum was passed. The weight of the magnetic fraction obtained from the magnetic separator was 8.8 pounds and an analysis of this fraction indicated the iron concentrate material contained 55.9 percent by weight of iron and 0.5 percent by weight of carbon. If a product containing a higher percentage of iron had been desired, the iron laden material could have been further upgraded by additional magnetic treatment.

The non-magnetic portion of the fly ash from the magnetic separation treatment weighed 91.1 pounds and analyzed 6.4 percent by weight of iron and 8.6 percent by weight of carbon. This non-magnetic portion of the fly ash was transported to a feeder from which it was fed by gravity into the inlet of an air classification apparatus. The particular air classification unit used was a Bauer Centri-Sonic Classifier and its rotating classifier unit was rotated at 625 RPM. In the air classification unit the non-magnetic fly ash was separated into two fractions. A first fine material was entrained in the stratified air stream and carried by the air stream to a cyclone dust collector. A total of 61.8 pounds of fine particles having an iron content of 4.5 percent and a carbon content of 7.5 percent was collected from the cyclone dust collector. The fine material had the particle size distribution shown in Table C.

TABLE C

| Tyler Sieve Size (mesh) | % by Weight |
|---|---|
| −100 +150 | 0.45 |
| −150 +200 | 2.98 |
| −200 +325 | 8.77 |
| −325 | 87.80 |

This fine material containing in excess of 85 percent of −325 mesh particles was found to be an extremely high grade and desirable pozzolan product in concrete.

The second, heavy ends, fraction from the air classification unit was not entrained in the air stream and dropped past the classifier zone to a fan which discharged it to another cyclone collector. The heavy ends fraction weighed 27.1 pounds and contained 18.9 percent iron by weight and 11 percent carbon by weight.

The heavy ends material was transported to a dry Tyler screen which separated the material into a +150 mesh fraction and a −150 mesh fraction. The +150 mesh fraction weighed 6.2 pounds and contained 25.5 percent by weight of carbon.

The −150 mesh fraction from the dry screening operation weighed 20 pounds. A first analysis of a sample of this material showed an iron concentration of 22.5 percent by weight and a carbon concentration of 6.3 percent by weight. The −150 mesh product was blended with some of the fine accepts material from the air classification unit to produce a uniform sinter blend containing 8.8 iron by weight. As further analyses were made, the amount of pozzolan was varied to maintain a substantially constant chemical composition for the sinter blend. The sinter blend was then formed into lightweight aggregate by the process described in U.S. Pat. No. 3,213,167. The fired aggregates were tan colored and had a bulk density of 52 lbs./cu.ft. and a load strength of 190 lbs.

Example II

Sixty-seven pounds of a fly ash material having an iron concentration of 9.5 by weight and a carbon concentration of 6.9 percent by weight was processed in a manner similar to that described in Example I. However, a 115 mesh screen was substituted for the 150 mesh screen of Example 1 in the dry screening operation. The products obtained during this process are tabulated in Table D.

TABLE D

| Product | Lbs. |
|---|---|
| Iron concentrate product containing 49.1% iron and 0.83% carbon | 3.1 |
| Pozzolan product containing 5.38% iron and 7.47% carbon | 39.5 |
| Carbon product (+115 mesh) containing 30% carbon | 2.6 |
| Material to be agglomerated containing 13.26% iron and 5.27% carbon | 21.8 |

A portion of the material suitable for agglomeration was blended with some of the pozzolan product to form a sinter blend having an iron concentration of 7.6 percent by weight and a carbon concentration of 6.7 percent by weight. The sinter blend produced a light tan colored fired pellet when pelletized and sintered as described in Example I.

Example III

In this example, 100 pounds of the fly ash material of Example I was delivered directly to the air classifier described therein. The fines constituted 59.8 percent of the material and had an Fe content of 6.8 percent and a carbon content of 8.2 percent. An analysis showed that 96 percent of the material passed through a 325 mesh screen, and the material comprised a high grade pozzolan without further treatment.

The heavy ends from the air classifier constituted 40.2 percent of the original fly ash, and were treated magnetically to remove the iron. An iron concentrate comprising 9.3 percent of the original fly ash was obtained, and an analysis of the concentrate showed an iron content of 59 percent with a carbon content of 0.3 percent.

The non-magnetic portion was screened on a 115 mesh screen to yield 4.5 percent of a coarser carbon product with a carbon content of 34 percent and an iron content of 9.1 percent; and a finer portion suitable for agglomeration comprising 26.4 percent of the original fly ash and having an iron content of 7.7 percent and a carbon content of 6.6 percent.

While the above invention has been described with reference to certain embodiments thereof, it is not intended that such embodiments shall be regarded as limitations upon the scope of the invention. It will be obvious to those skilled in the art that other modifications and variations of the invention can be made and various equivalents substituted therein without departing from the principles disclosed or going outside the scope of the specification or the purview of the claims.

What we claim is:

1. A process for the complete beneficiation of fly ash which comprises the steps of: air classifying the fly ash material into a pozzolanic material of extremely fine and uniform particle size at least 85 percent by weight of which passes through a 325 mesh screen and a heavy ends fraction; dry screening said heavy ends fly ash fraction to obtain a coarse carbon-containing product containing a minimum of 25 percent by weight of carbon and a fine fly ash fraction; and magnetically separating said fine fly ash fraction into an iron concentrate product and a fraction suitable for agglomeration.

2. The process of claim 1 including the step of subjecting said pozzolanic material to magnetic separation to remove magnetic materials therefrom.

3. The process of claim 1 including the step of pulmerizing said heavy ends fly ash fraction prior to dry screening.

* * * * *